(12) United States Patent
Watanabe et al.

(10) Patent No.: US 11,535,155 B2
(45) Date of Patent: Dec. 27, 2022

(54) SUPERIMPOSED-IMAGE DISPLAY DEVICE AND COMPUTER PROGRAM

(71) Applicant: AISIN CORPORATION, Kariya (JP)

(72) Inventors: Kenji Watanabe, Okazaki (JP); Hiroyuki Miyake, Toyota (JP); Yuusuke Morita, Okazaki (JP)

(73) Assignee: AISIN CORPORATION, Kariya (JP)

( * ) Notice: Subject to any disclaimer, the term of this patent is extended or adjusted under 35 U.S.C. 154(b) by 327 days.

(21) Appl. No.: 16/649,365

(22) PCT Filed: Jul. 19, 2018

(86) PCT No.: PCT/JP2018/027054
§ 371 (c)(1),
(2) Date: Mar. 20, 2020

(87) PCT Pub. No.: WO2019/097763
PCT Pub. Date: May 23, 2019

(65) Prior Publication Data
US 2020/0269759 A1 Aug. 27, 2020

(30) Foreign Application Priority Data
Nov. 17, 2017 (JP) .............................. JP2017-222168

(51) Int. Cl.
*B60R 1/00* (2022.01)
*B60K 35/00* (2006.01)

(52) U.S. Cl.
CPC .............. *B60R 1/001* (2013.01); *B60K 35/00* (2013.01); *B60K 2370/149* (2019.05);
(Continued)

(58) Field of Classification Search
CPC ............ B60K 35/00; B60K 2370/1529; B60K 2370/166; B60K 2370/80; G01C 21/365
See application file for complete search history.

(56) References Cited

U.S. PATENT DOCUMENTS

2009/0240426 A1 9/2009 Akita et al.
2010/0073773 A1 3/2010 Hotta et al.
(Continued)

FOREIGN PATENT DOCUMENTS

JP     H10-253380 A     9/1998
JP     2005-069776 A     3/2005
(Continued)

OTHER PUBLICATIONS

Oct. 9, 2018 International Search Rpeort issued in International Patent Application No. PCT/JP2018/027054.

*Primary Examiner* — Christopher E Leiby
(74) *Attorney, Agent, or Firm* — Oliff PLC

(57) ABSTRACT

Superimposed-image display devices and programs display a guide image providing a guidance of information to a driver of a vehicle such that the guide image is superimposed on a view ahead of the vehicle and is visually recognized. The systems and programs obtain three-dimensional map information that specifies a three-dimensional shape of a road and a structure nearby the road and arrange the guide image in the three-dimensional map information, based on the three-dimensional shape of the road and the structure nearby the road. The systems and programs obtain a shape of the guide image that is visually recognized from a position of the driver in the three-dimensional map information and display the guide image having the obtained shape.

9 Claims, 8 Drawing Sheets

(52) U.S. Cl.
CPC .............. *B60K 2370/1529* (2019.05); *B60K 2370/166* (2019.05); *B60K 2370/785* (2019.05); *B60R 2300/205* (2013.01); *B60R 2300/308* (2013.01)

(56) References Cited

U.S. PATENT DOCUMENTS

| | | | |
|---|---|---|---|
| 2011/0103651 A1 | 5/2011 | Nowak et al. | |
| 2015/0029214 A1 | 1/2015 | Kumagai | |
| 2016/0203629 A1* | 7/2016 | Takeda ................ | G09B 29/00 345/632 |
| 2016/0349066 A1* | 12/2016 | Chung ............... | G01C 21/3658 |
| 2018/0292229 A1 | 10/2018 | Maruyama et al. | |
| 2019/0043235 A1 | 2/2019 | Tsushima et al. | |
| 2020/0184219 A1* | 6/2020 | Mugura ................ | G06V 20/20 |

FOREIGN PATENT DOCUMENTS

| | | |
|---|---|---|
| JP | 2005-98917 A | 4/2005 |
| JP | 2010-76533 A | 4/2010 |
| JP | 2011-529569 A | 12/2011 |
| JP | 2017-21546 A | 1/2017 |
| JP | 2017-32440 A | 2/2017 |
| JP | 6214798 B1 | 10/2017 |
| WO | 2007/145190 A1 | 12/2007 |
| WO | 2013/111302 A1 | 8/2013 |
| WO | 2017/056210 A1 | 4/2017 |
| WO | 2017/163385 A1 | 9/2017 |

* cited by examiner

SHAPE OF GUIDE IMAGE TO BE STORED

SUPERIMPOSED-IMAGE DISPLAY DEVICE AND COMPUTER PROGRAM

TECHNICAL FIELD

Related technical fields include superposed image display devices and computer programs that assist traveling of a vehicle.

BACKGROUND

Various means have been used as information providing means that provides an occupant of a vehicle with various types of information, such as route guidance and a warning for an obstacle, for supporting traveling of the vehicle. Examples of such tools include a liquid crystal display installed on the vehicle to provide visual indication and a speaker to output audio. One example of recent information providing means of this type is a device, such as a head-up display (hereinafter referred to as an "HUD") and a windshield display (hereinafter referred to as a "WS D"), that provides information by displaying an image superimposed on the surrounding environment (view) of the driver.

With the HUD and the WS D described above, a shape of an image and a display location of the image need to be calculated based on a position of an eye of an occupant that recognizes the image and a location in the outside world where the image is superimposed, in order to superimpose the image at a position intended by the device (for example, a road surface at an intersection) and cause the occupant to recognize the image. For example, in Japanese Unexamined Patent Application Publication No. 2010-76533 (JP 2010-76533 A), a technique is disclosed in which a camera or the like is used to obtain information of the world outside the vehicle as well as to specify a position of a target on which the image is superimposed and detect a position of an eye of an occupant in the vehicle in order to calculate a shape of an image and a display position of the image to be displayed on the HUD based on the position of the specified target and the position of the eye of the occupant.

SUMMARY

Although the position of the target and the position of the eye of the occupant is taken into consideration in the technique described in the above Patent Document 1, shapes of structures such as roads, buildings, and road signs in the background of where the target is displayed are not taken into consideration. Thus, there has been a problem that it is difficult to accurately express the positional relationship between the image and the structure when a part of the displayed image is superimposed with the above structures.

Exemplary embodiments of the broad inventive principles described herein address the foregoing issue of the related art, and therefore has an object to provide a superimposed image display device and a computer program capable of causing a driver of a vehicle to accurately recognize the positional relationship between a guide image and a nearby structure.

Exemplary embodiments provide superimposed-image display devices and programs display a guide image providing a guidance of information to a driver of a vehicle such that the guide image is superimposed on a view ahead of the vehicle and is visually recognized. The systems and programs obtain three-dimensional map information that specifies a three-dimensional shape of a road and a structure nearby the road and arrange the guide image in the three-dimensional map information, based on the three-dimensional shape of the road and the structure nearby the road. The systems and programs obtain a shape of the guide image that is visually recognized from a position of the driver in the three-dimensional map information and display the guide image having the obtained shape.

According to the superimposed image display device and the computer program having the above configuration, the shape of the guide image to be displayed is specified by arranging the guide image in the three-dimensional map information that specifies the three-dimensional shape of the road and the structures nearby the road. This allows the driver of the vehicle to accurately recognize the positional relationship between the guide image and the nearby structure.

DETAILED DESCRIPTION OF EXEMPLARY EMBODIMENTS

Figure 1:
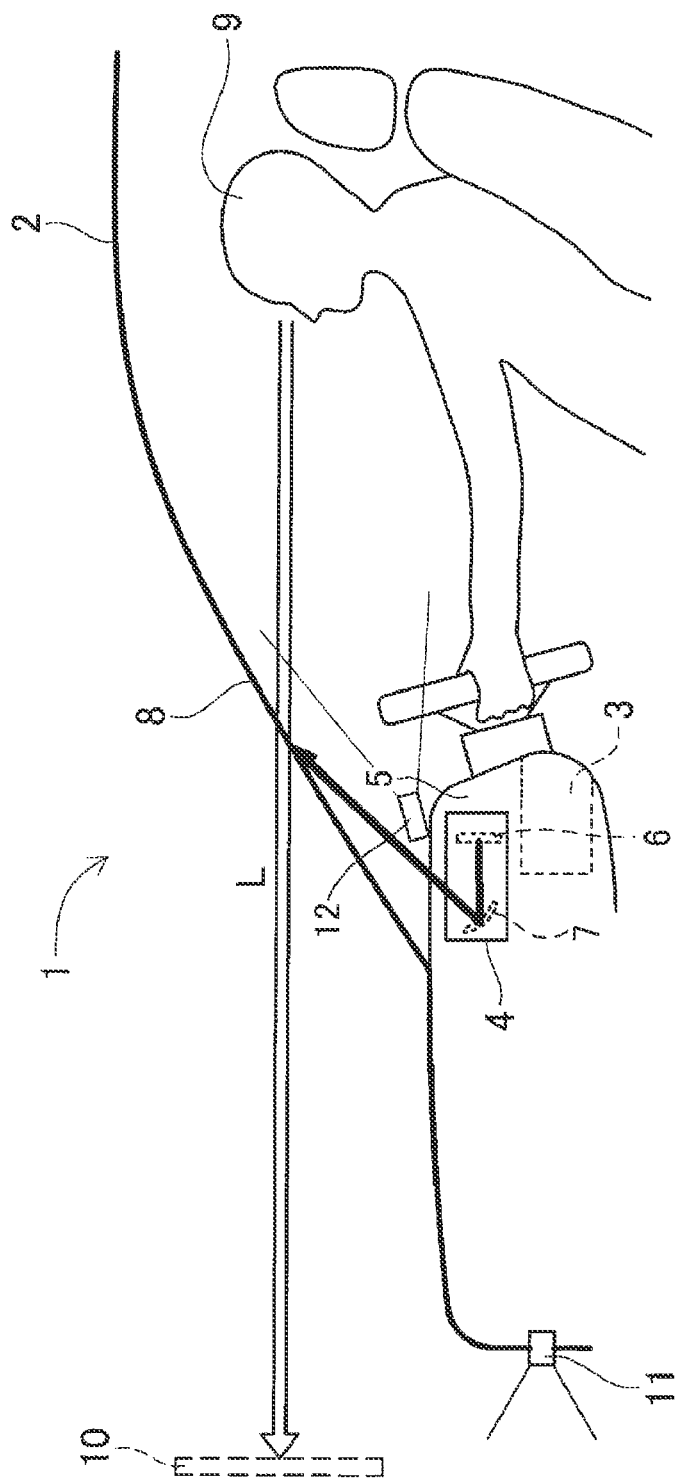
FIG. 1 is a schematic configuration diagram of a superimposed image display device according to the present embodiment.

Hereinafter, a first embodiment in which a superimposed image display device is embodied will be described with reference to the drawings. First, the general configuration of a superimposed image display device 1 according to the present embodiment will be described with reference to FIG. 1. FIG. 1 is a schematic configuration diagram of the superimposed image display device 1 according to the present embodiment.

As illustrated in FIG. 1, the superimposed image display device 1 generally includes a navigation device 3 mounted on a vehicle 2, and a head-up display device (hereinafter referred to as an "HUD") 4 also mounted on the vehicle 2 and connected to the navigation device 3.

The navigation device 3 has functions for searching for a recommended route to the destination, displaying a map image around the current position of the vehicle 2 based on map data obtained from a server or stored in a memory, and providing travel guidance according to a set guide route together with the HUD 4. The navigation device 3 does not have to have all the functions described above. It is enough for the navigation device 3 to have the function for providing travel guidance according to a set guide route. The details of the structure of the navigation device 3 will be described below.

In contrast, the HUD 4 is disposed in a dashboard 5 of the vehicle 2, and includes therein a liquid crystal display 6 serving as an image display surface to display an image. The image projected on the liquid crystal display 6 is reflected on a windshield 8 in front of the driver's seat through a concave mirror 7 and so on of the HUD 4 as will be described below, so as to be visually recognized by a driver 9 of the vehicle 2. The image that is displayed on the liquid crystal display 6 includes information about the vehicle 2 and various types of information used for assisting the driver 9 in driving. For example, the image may include a warning that warns the driver 9 of an object (other vehicles and pedestrians) to pay attention to, a guide route set in the navigation device 3, guide information (such as an arrow pointing the right or left turning direction) based on the guide route, a warning to be displayed on the road surface (such as collision warning and speed limit), the current vehicle speed, a sign image, a guidance line image, a map image, traffic information, news, a weather report, time of day, the screen of a connected smartphone, and a TV program.

The HUD 4 of the present embodiment is configured such that, when the driver 9 visually recognizes the image displayed on the liquid crystal display 6 through reflection on the windshield 8, the image displayed on the liquid crystal display 6 is visually recognized by the driver 9 as a virtual image 10 not on the windshield 8, but at a position far ahead of the windshield 8. The virtual image 10 is displayed to be superimposed on the view (real view) ahead of the vehicle, and may be displayed to be superimposed on any object (such as a road surface, a building, a moving object to pay attention to) located ahead of the vehicle. The virtual image 10 that the driver 9 can visually recognize is the image displayed on the liquid crystal display 6, and the image may be reversed in an up-down direction or a left-right direction through the concave mirror 7 and other mirrors. Therefore, the image needs to be displayed on the liquid crystal display 6 considering such reversal. The size of the image is also changed through the concave mirror 7.

The position where the virtual image 10 is generated, more specifically, a distance (hereinafter referred to as an "imaging distance") L from the driver 9 to the virtual image 10 can be appropriately set in accordance with the curvature of the concave mirror 7 of the HUD 4, the relative positions of the liquid crystal display 6 and the concave mirror 7, and so on. For example, if the curvature of the concave mirror 7 is fixed, the imaging distance L is determined by a distance (optical path length) along the optical path from the position where the image is displayed on the liquid crystal display 6 to the concave mirror 7. The optical path is set such that the imaging distance L is set to 2.5 m, for example.

Further, in the present embodiment, although the HUD 4 is used as the means for displaying an image to be superimposed on the view ahead of the vehicle, other means may be used. For example, a windshield display (WSD) that displays an image on the windshield 8 may be used. The WSD may display an image from a projector onto the windshield 8 serving as a screen, or the windshield 8 may be a transmissive liquid crystal display. As in the case of the HUD 4, the image displayed on the windshield 8 by the WSD is superimposed on the view ahead of the vehicle.

Alternatively, the image of the view ahead of the vehicle captured by a front camera 11 (described below) may be displayed on a vehicle-mounted liquid crystal display, and an image to be superimposed on the displayed view may be displayed on the same liquid crystal display. In this case, as in the case of the HUD 4, the image displayed on the liquid crystal display is superimposed on the view ahead of the vehicle.

Further, the front camera 11 is disposed on the upper side of the front bumper of the vehicle or on the back of the rearview mirror. The front camera 11 is an image capturing device having a camera using a solid-state image sensor such as a CCD, and is disposed such that the optical axis extends forward in the travel direction of the vehicle. Then, image processing is performed on a captured image captured by the front camera 11, so that the conditions of the front environment (that is, the environment on which the virtual image 10 is superimposed) visually recognized through the windshield 8 by the driver 9 are detected. It should be noted that a sensor such as a millimeter-wave radar may be used in place of the front camera 11.

An in-vehicle camera 12 is disposed on the upper surface of the instrument panel of the vehicle. The in-vehicle camera 12 is an image capturing device having a camera using a solid-state image sensor such as a CC D, and is disposed such that the optical axis extends toward the driver's seat. The in-vehicle camera 12 captures an image of the face of the driver 9 sitting in the driver's seat. Then, image processing is performed on the captured image captured by the in-vehicle camera 12, thereby detecting the position of the eye of the driver 9 (sight line start point) and the sight line direction.

Figure 2:
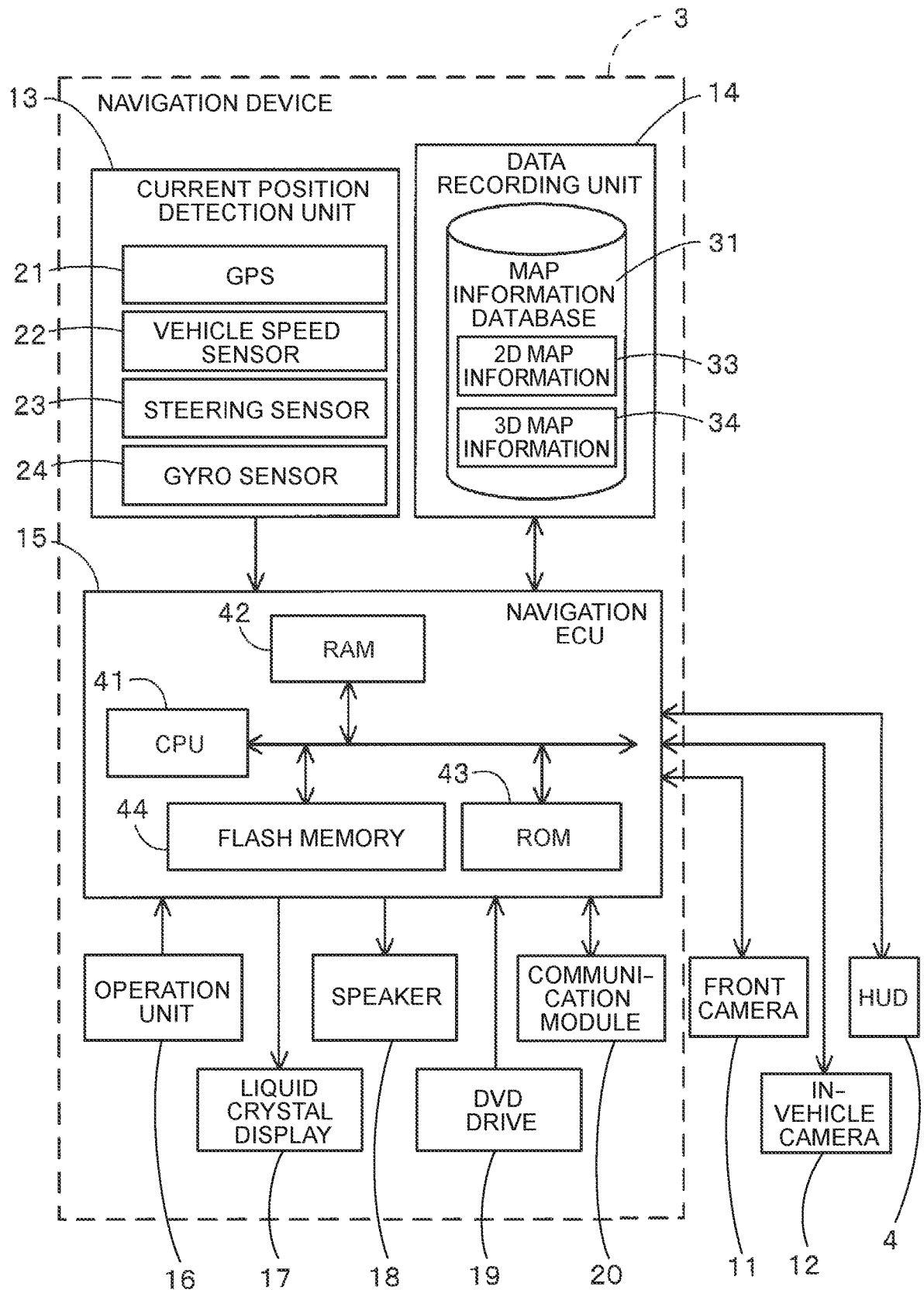
FIG. 2 is a block diagram illustrating a navigation device according to the present embodiment.

In the following, the general configuration of the navigation device 3 of the superimposed image display device 1 will be described with reference to FIG. 2. FIG. 2 is a block diagram illustrating the navigation device 3 according to the present embodiment.

As illustrated in FIG. 2, the navigation device 3 according to the present embodiment includes a current position detection unit 13 that detects a current position of the vehicle 2 on which the navigation device 3 is mounted, a data recording unit 14 in which various types of data are recorded, a navigation ECU 15 that performs various types of arithmetic processing based on received information, an operation unit 16 that receives an operation from the user, a liquid crystal display 17 that displays a map around the vehicle and facility information about facilities for the user, a speaker 18 that outputs voice guidance about route guidance, a DVD drive 19 that reads a DVD serving as a storage medium, and a communication module 20 that communicates with an information center such as the VICS (registered trademark: Vehicle Information and Communication System) center. (As used herein, the term "storage medium" does not encompass transitory signals.) Further, the HUD 4, the front camera 11, the in-vehicle camera 12, and so on described above are connected to the navigation device 3 via an in-vehicle network such as a CAN.

Hereinafter, the components of the navigation device 3 will be described one by one.

The current position detection unit 13 includes a GPS 21, a vehicle speed sensor 22, a steering sensor 23, and a gyro sensor 24, and is capable of detecting the current position of the vehicle, the direction, the travel speed of the vehicle, the current time, and so on. In particular, the vehicle speed sensor 22 is a sensor for detecting the travel distance of the vehicle and the vehicle speed. The vehicle speed sensor 22 generates pulses according to the rotation of the driving wheels of the vehicle, and outputs a pulse signal to the navigation ECU 15. Then, the navigation ECU 15 calculates the rotational speed of the driving wheels and the travel distance by counting the generated pulses. It should be noted that the navigation device 3 does not have to have all of the four types of sensors, and the navigation device 3 may have only one or more of these sensors.

The data recording unit 14 includes a hard disk (not illustrated) serving as an external storage unit and a storage medium, and a recording head (not illustrated) serving as a driver for reading the map information database 31 recorded in the hard disk and a predetermined program and writing predetermined data to the hard disk. The data recording unit 14 may include a flash memory, a memory card, and an optical disc such as a CD and a DVD. Further, the map information database 31 may be stored in an external server and obtained by the navigation device 3 through communication.

The map information database 31 stores two-dimensional map information 33 and three-dimensional map information 34. The two-dimensional map information 33 is map information used in the typical navigation device 3, and includes, for example, link data about roads (links), node data about nodes, facility data about facilities, search data used for route search processing, map display data for displaying a map, intersection data about intersections, and point retrieval data for retrieving a point.

Meanwhile, the three-dimensional map information 34 includes not only plane information but also height information so as to represent a map in three dimensions. In particular, in the present embodiment, the three-dimensional map information 34 is map information for representing the contour of roads, the shape of buildings, road lines, traffic lights, road signs, other signs, and so on in three dimensions. The three-dimensional map information 34 may also include other information than the contour of roads, the shape of buildings, road lines, traffic lights, road signs, and other signs described above. For example, the three-dimensional map information 34 may include information for representing roadside trees and road surface markings in three dimensions. Alternatively, a map on which objects such as the contour of roads, the shape of buildings, road lines, traffic lights, road signs, other signs, and so on are arranged in three-dimensional space may be stored as the three-dimensional map information 34, or information necessary for representing a map in three dimensions (three-dimensional coordinate data of the contour of roads, the shape of buildings, road lines, traffic lights, road signs, and other signs) may be stored as the three-dimensional map information 34. In the case where information necessary for representing a map in three dimensions is stored, the navigation device 3 generates a map that represents a target area in three dimensions, using the information stored as the three-dimensional map information 34 as need arises.

The navigation device 3 provides common functions, such as displaying a map image on the liquid crystal display 17 and searching for a guide route, by using the two-dimensional map information 33. Whereas, the navigation device 3 performs processing for displaying a guide image (described below), by using the three-dimensional map information 34 in addition to the two-dimensional map information 33.

The navigation electronic control unit (ECU) 15 is an electronic control unit that controls the whole navigation device 3, and includes a CPU 41 serving as an arithmetic unit and a control unit, a RAM 42 that is used as a working memory when the CPU 41 performs various types of arithmetic processing and that stores route data and so on when a route is retrieved, a ROM 43 storing a travel support processing program (FIG. 3) (described below) and so on in addition to a control program, and an internal storage unit such as a flash memory 44 that stores a program read from the ROM 43. The navigation ECU 15 has various means serving as processing algorithms. For example, the map information obtaining means obtains the three-dimensional map information 34 that specifies the three-dimensional shape of the road and the structures nearby the road. The image arranging means arranges the guide image in the three-dimensional map information 34 based on the three-dimensional shape of the road and the structures nearby the road. The shape obtaining means obtains the shape of the guide image that is visually recognized from a position of the driver in the three-dimensional map information. The guide image displaying means displays the guide image having the shape obtained by the shape obtaining means.

The operation unit 16 is operated when entering the departure point as the travel start point and the destination as the travel end point, and includes a plurality of operation switches (not illustrated) such as various keys and buttons. Then, the navigation ECU 15 performs control so as to execute various operations corresponding to switch signals that are output when the switches are pressed. The operation unit 16 may include a touch panel on the front surface of the liquid crystal display 17. Further, the operation unit 16 may include a microphone and a speech recognition device.

The liquid crystal display 17 displays a map image including roads, traffic information, operation guide, an operation menu, a description of keys, a guide route from the departure point to the destination, guide information according to the guide route, news, a weather report, and a TV program. It should be noted that in the present embodiment, since the HUD 4 is provided as the means for displaying information, the liquid crystal display 17 does not have to be provided in the case where the HUD 4 displays the map image and so on.

The speaker 18 outputs voice guidance for guiding travel according to the guide route based on an instruction from the navigation ECU 15, and a traffic information guidance.

The DVD drive 19 is a drive that can read data recorded on a storage medium such as a DVD and a CD. Then, music and video is played, or the map information database 31 is updated, based on of the read data. A card slot for reading data from and writing data to a memory card may be provided in place of the DVD drive 19.

The communication module 20 is a communication device for receiving traffic information including congestion information, regulatory information, traffic accident information, that is transmitted from a traffic information center, such as a VICS center or a probe center. Examples of the communication module 20 include a mobile phone and a DCM.

Figure 3:
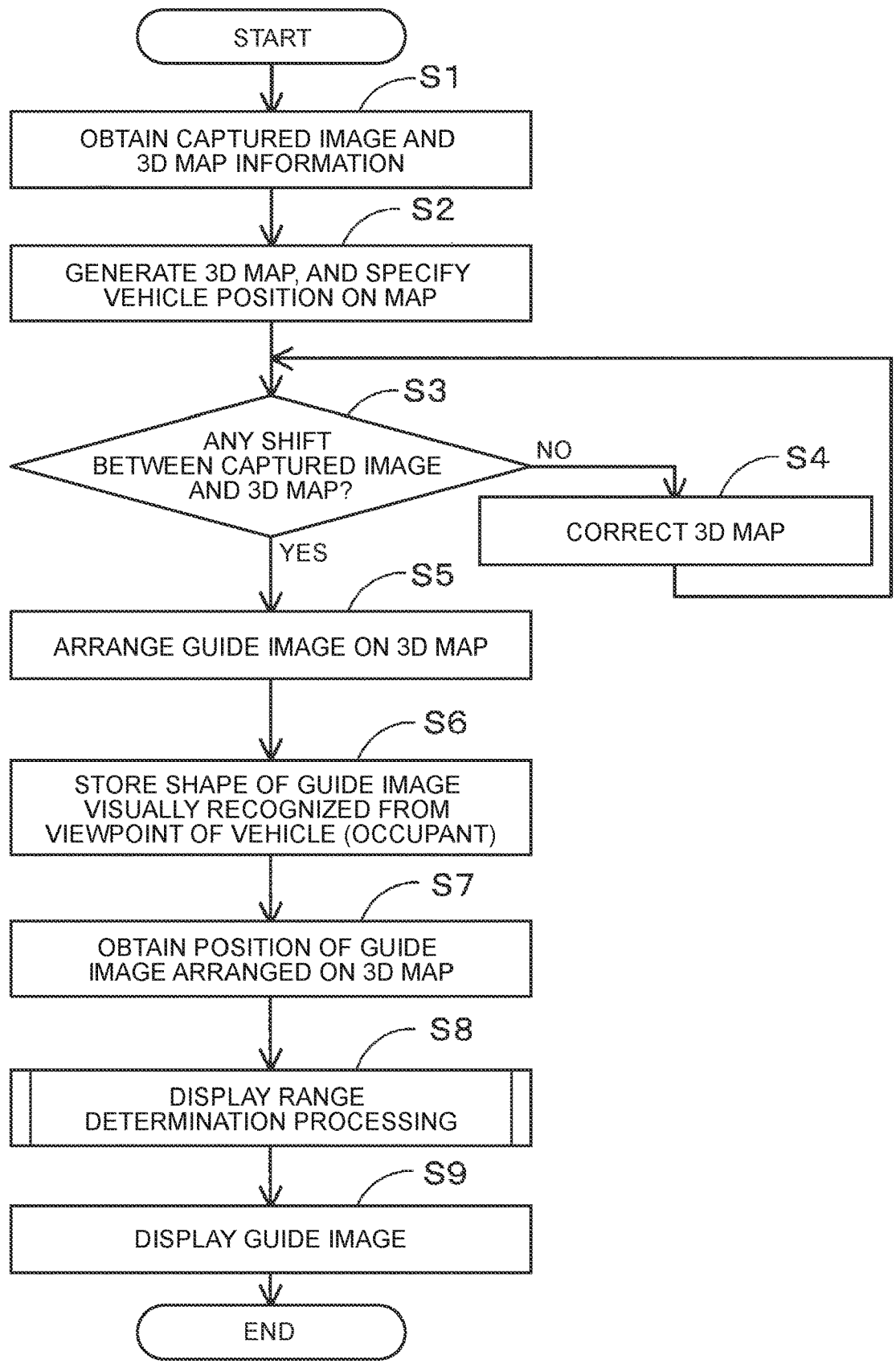
FIG. 3 is a flowchart of a travel support processing program according to the present embodiment.

In the following, a travel support processing program that is executed particularly on the navigation device 3 of the superimposed image display device 1 having the above configuration will be described with reference to FIG. 3. FIG. 3 is a flowchart of the travel support processing program according to the present embodiment. The travel support processing program is a program that is executed after an ACC power supply (accessory power supply) of the vehicle is turned ON, and provides various types of information such as guidance on the travel direction of the vehicle along the guide route to the driver 9 of the vehicle 2, using the HUD 4. The program illustrated in the flowcharts of FIGS. 3 and 10 described below is stored in the RAM 42 or the ROM 43 of the navigation device 3, and is executed by the CPU 41.

In the travel support processing program, first, in step (hereinafter abbreviated as "S") 1, the CPU 41 obtains a captured image of a surrounding environment (view) ahead of the vehicle captured by the front camera 11. Further, the CPU 41 reads the three-dimensional map information 34 around the current position of the vehicle from the map information database 31. The three-dimensional map information 34 stores information necessary for representing a map in three dimensions (three-dimensional coordinate data such as the contour of roads, the shape of buildings, road lines, road signs, and other signs).

Then, in S2, the CPU 41 generates a three-dimensional map (map representing buildings, roads, and so on in three dimensions) around the current position of the vehicle, based on the three-dimensional map information 34 read in the above S1. Specifically, the CPU 41 generates a three-dimensional map by executing the following processing.

First, the CPU 41 obtains objects (shape data) created by modeling roads, buildings, road signs, other signs, and so on in three-dimensional space from the three-dimensional map information 34. The CPU 41 may obtain an applicable object from among objects that are modeled and stored in a database beforehand, or may newly create an object by performing modeling in S2. In the case of performing modeling, the CPU 41 obtains information specifying the shape and position of a road or structures (such as buildings, road signs, and other signs) nearby a road from the three-dimensional map information 34, and performs modeling based on the obtained information.

Modeling is processing for creating a shape of a model (object) in three-dimensional space. More specifically, modeling includes determining the coordinates of the vertices, and determining parameters of the equations representing boundaries and surfaces. Modeling is well known in the art, and therefore will not be described in detail herein. The modeled object (shape data) is represented in the form of a "wire-frame model" showing only the edges, a "surface model" showing only the surfaces, or the like, according to the intended use. Then, the three-dimensional space in which the objects are formed is used as a three-dimensional map.

In the above S2, the CPU 41 also specifies the current position and direction of the vehicle on the generated three-dimensional map, based on the parameters detected by the current position detection unit 13. In order to facilitate comparison processing between the three-dimensional map and the captured image (described below), it is preferable that especially the installation position of the front camera 11 installed on the vehicle be defined as the current position of the vehicle, and the optical axis direction of the front camera 11 be defined as the direction of the vehicle.

Figure 4:
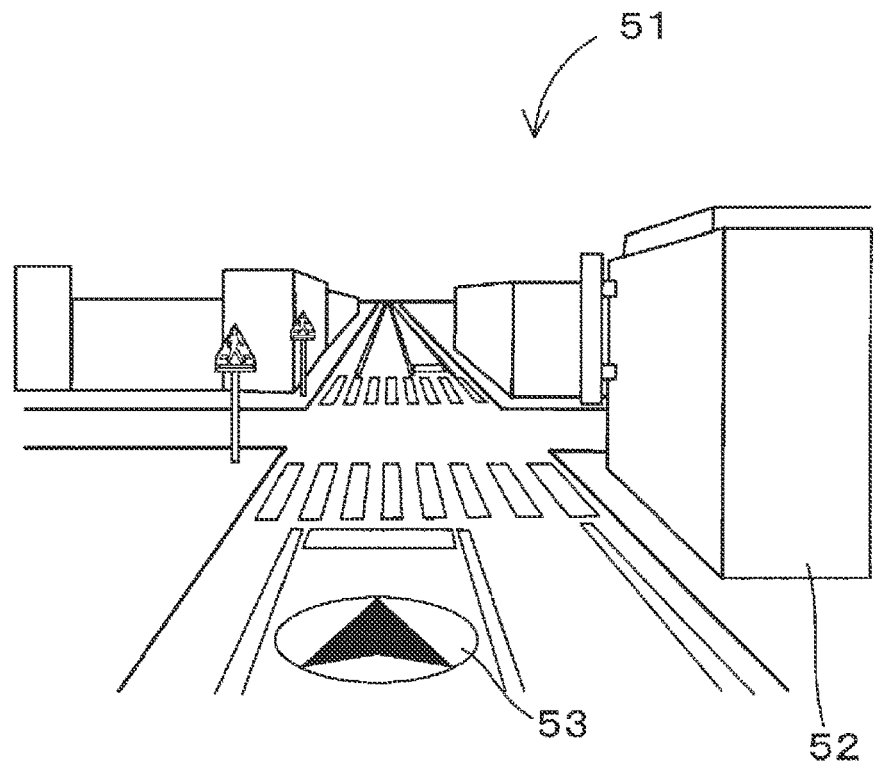
FIG. 4 illustrates a three-dimensional map generated based on three-dimensional map information.

FIG. 4 illustrates an example of a three-dimensional map 51 generated in the above S3. As illustrated in FIG. 4, the three-dimensional map 51 represents three-dimensional space in which objects 52 representing roads and structures (such as buildings, road signs, and other sings) are arranged. Especially, the objects 52 representing the roads and structures around the current position of the vehicle are arranged. Further, a vehicle position mark 53 indicating the current position and direction of the vehicle is also arranged on the three-dimensional map 51.

Then, in S3, the CPU 41 compares the captured image obtained in the above S1 with the three-dimensional map generated in the above S2 so as to determine whether there is a shift between the two. Specifically, the CPU 41 sets the current position of the vehicle on the three-dimensional map (more specifically, the installation position of the front camera 11, with its height taken into account) as the viewpoint, sets the direction of the vehicle as the sight line direction, and compares an image of the three-dimensional map visually recognized from the set viewpoint in the set sight line direction with the captured image. It should be noted that the three-dimensional map does not contain moving objects such as pedestrians and other vehicles, and some stationary objects such as trees, and therefore a shift resulting from these objects are generally disregarded when making a determination. Further, it is preferable that the CPU 41 determine that there is no shift not only when the two images exactly coincide, but also when there is a little shift within an allowable range.

Then, if a determination is made that there is no shift between the captured image obtained in the above S1 and the three-dimensional map generated in the above S2 (S3: YES), the process goes to S5. In contrast, if a determination is made that there is a shift between the captured image obtained in the above S1 and the three-dimensional map generated in the above S2 (S3: NO), the process goes to S4.

In S4, the CPU 41 corrects the three-dimensional map generated in the above S2, by correcting the current position and direction of the vehicle set on the three-dimensional map so as to reduce the shift from the captured image obtained in above step S1. It should be noted that the CPU 41 may correct the objects while maintaining the current position and direction of the vehicle on the three-dimensional map fixed. As a result, the current position and direction of the vehicle on the three-dimensional map (more specifically, the installation position and the optical axis direction of the front camera 11) can be accurately specified. Then, the process returns to S3.

Comparison of the captured image in the above S3 and the three-dimensional map is executed at intervals of a prescribed period of time to reduce processing load. The timing of executing the comparison is the timing at which the structure having a distinctive shape, which can be easily compared, is included in the captured image. The position of the vehicle in the three-dimensional map information during the time between the timings at which comparison is performed (during the time from when comparison is performed to when the subsequent comparison is performed) is estimated by the CPU 41 by using sensors such as the vehicle speed sensor 22 and the gyro sensor 24. When the eye position of the driver of the vehicle is specified during the time between the timings at which comparison is performed as described below (S6), the eye position of the driver is specified based on the above estimated position of the vehicle.

In contrast, in S5, the CPU 41 arranges various guide images for proposing information to the driver of the vehicle, on the three-dimensional map information generated in the above S3. Specifically, guide images of the following three types (A) to (C) are arranged, in the present embodiment.

(A) An image of an arrow that provides guidance about the travel direction of the vehicle that travels on a travel path after leaving the guide branch point (hereinafter, referred to as a guide branch point image).

(B) An image of a sign advertising a facility along the travel path of the vehicle (hereinafter referred to as a sign image).

(C) An image of the guidance line on the road surface (hereinafter referred to as a guidance line image).

Here, the "(A) guide branch point image" is arranged on the three-dimensional map when the guide branch point is within a prescribed distance (for example, 700 m) ahead of the vehicle in the travel direction. The position at which the guide branch point image is arranged is a position upwardly spaced by a prescribed distance (for example, 1 m) from the road surface of the travel path (for example, a road connected to a left side of the guide branch point in the case of turning left at the guide branch point) on which the vehicle travels after leaving the guide branch point. The guide branch point image is arranged so as to extend vertically upward and is in a three-dimensional shape.

The "(B) sign image" is arranged on the three-dimensional map when there is a facility that is to be advertised within a prescribed distance (for example, 700 m) ahead of the vehicle in the travel direction. The position at which the sign image is arranged is a wall surface of the facility that is to be advertised and the sign image is arranged in parallel with the wall surface in a two-dimensional shape.

In contrast, the "(C) guidance line image" is arranged on the three-dimensional map as a line corresponding to a roadway outer line (that is, a line indicating a limit of a range in which the vehicle can travel) especially when the vehicle travels on a road on which the roadway outer line is not drawn. When there is a sidewalk, the position at which the guidance line image is arranged is the position that is a boundary between a roadway and a sidewalk. When there is no sidewalk, the position at which the guidance line image is arranged is the position corresponding to the edge of the roadway. The guidance line image is arranged in parallel with the road surface in a two-dimensional shape. The shape of the guidance line image is the same shape as the roadway outer line and a display color is white or yellow. Even if the roadway outer line is drawn, the guidance line image may be similarly arranged when the visibility of the roadway outer line from the driver of the vehicle is determined to be equal to or less than a threshold. For example, visibility of the roadway outer line is performed based on an illuminance sensor, a rainfall sensor, a captured image captured by the front camera 11 and the like. H ere, the sensors and the front camera are provided on the vehicle. Visibility of the roadway outer line is decreased when it is snowing, when it is raining, at night, when road paint is degraded, and the like. Guidance lines corresponding to partition lines other than the roadway outer line (such as a roadway center line and a lane boundary line) and other road surface markings (such as a stop line) may be included in the guidance line images.

Figure 5:
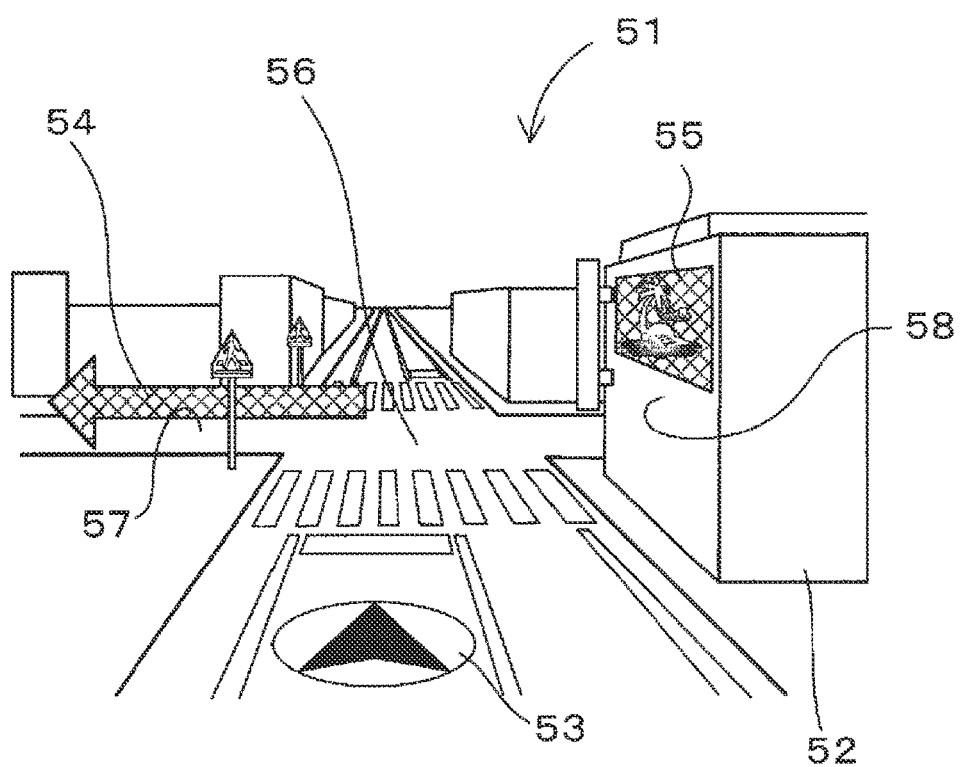
FIG. 5 illustrates a three-dimensional map with a guide branch point image and a sign image arranged thereon.

Here, FIG. 5 illustrates the three-dimensional map 51 with a guide branch point image 54 and a sign image 55 arranged thereon. As illustrated in FIG. 5, the guide branch point image 54 is an image of an arrow that provides guidance about the vehicle traveling along a road connected to the left side after exiting the guide branch point 56. The guide branch point image 54 is arranged so as to extend vertically upward at the position upwardly spaced by a predetermined distance (for example, 1 m) from the road surface 57 of the road connected to the left side of the guide branch point 56. In contrast, the sign image 55 is a sign image advertising a facility along the travel path of the vehicle and is arranged on the wall surface 58 of the facility that is to be advertised so that the sign image 55 is in parallel with the wall surface 58.

Figure 6:
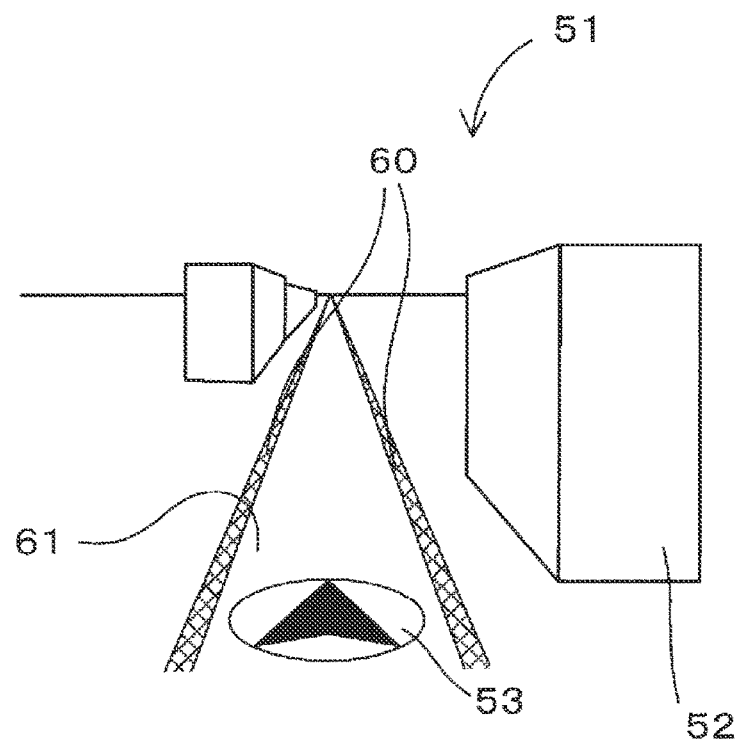
FIG. 6 illustrates a three-dimensional map with a guidance line image arranged thereon.

Meanwhile, FIG. 6 illustrates the three-dimensional map 51 with a guidance line image 60 arranged thereon. As illustrated in FIG. 6, the guidance line image 60 is an image indicating the limit of the range in which the vehicle can travel (corresponding to the roadway outer line) on the road surface of the road that the vehicle is traveling along. When there is a sidewalk, the guidance line image 60 is arranged at a position on the road surface 61 corresponding to the boundary between the roadway and the sidewalk. When there is no sidewalk, the guidance line image 60 is arranged at a position on the road surface 61 corresponding to the edge of the roadway. Here, the guidance line image 60 is arranged in parallel with the road surface 61. For example, the guidance line image 60 is arranged near the boundary between the road surface and the building or inward of the boundary by one meter in consideration of a sidewalk. The example illustrated in FIG. 6 indicates an example of the guidance line image 60 that is arranged when the road that the vehicle is traveling along is a one-way road. However, the guidance line image 60 corresponding to the road center line may be arranged at a position in the middle of the road when the road that the vehicle is traveling along is not a one-way road.

When a moving object (such as a pedestrian, a bicycle, and a vehicle) is detected near the vehicle, it is preferable that a model (virtual object) of the detected moving object be arranged at the position detected on the three-dimensional map generated in the above S2. The virtual object arranged on the three-dimensional map has a shape resembling the shape of the actual moving object. For example, when the moving object is a pedestrian, the virtual object is set to have a shape of a person, and when the moving object is a vehicle, the virtual object is set to have a shape of a vehicle. The size of the virtual object is also set to correspond to the size of the actual moving object. However, when the moving object is indefinite (the shape or the type cannot be specified), as an exception, the virtual object is set to be the smallest rectangular parallelepiped that includes the entire moving object.

In S6, the CPU 41 obtains an image of the three-dimensional map, with the guide image arranged thereon, that is visually recognized in the travel direction of the vehicle from the viewpoint of the vehicle (driver) (hereinafter referred to as a "visually-recognized image"). Especially, the viewpoint of the vehicle is set to the viewpoint of the driver of the vehicle. The position of the eye of the driver can be detected by the in-vehicle camera 12. The position of the eye of the driver on the three-dimensional map is specified by combining the current position and direction of the vehicle, which are finally specified as a result of comparison between the captured image and the three-dimensional map in the above S3, and the detection result of the in-vehicle camera 12. The visually-recognized image is an image that can be visually recognized when the objects (such as roads, buildings, road signs, other signs, guide image, and virtual objects of moving objects) arranged on the three-dimensional map are visually recognized in the travel direction of the vehicle from the viewpoint of the driver. The visually-recognized image corresponds to a visual field of the driver. It should be noted that the visually-recognized image does not have to be an image visually recognized in the travel direction of the vehicle as long as the visually-recognized image is an image visually recognized from the viewpoint of the driver. However, the visually-recognized image needs to include at least the guide image.

Figure 7:
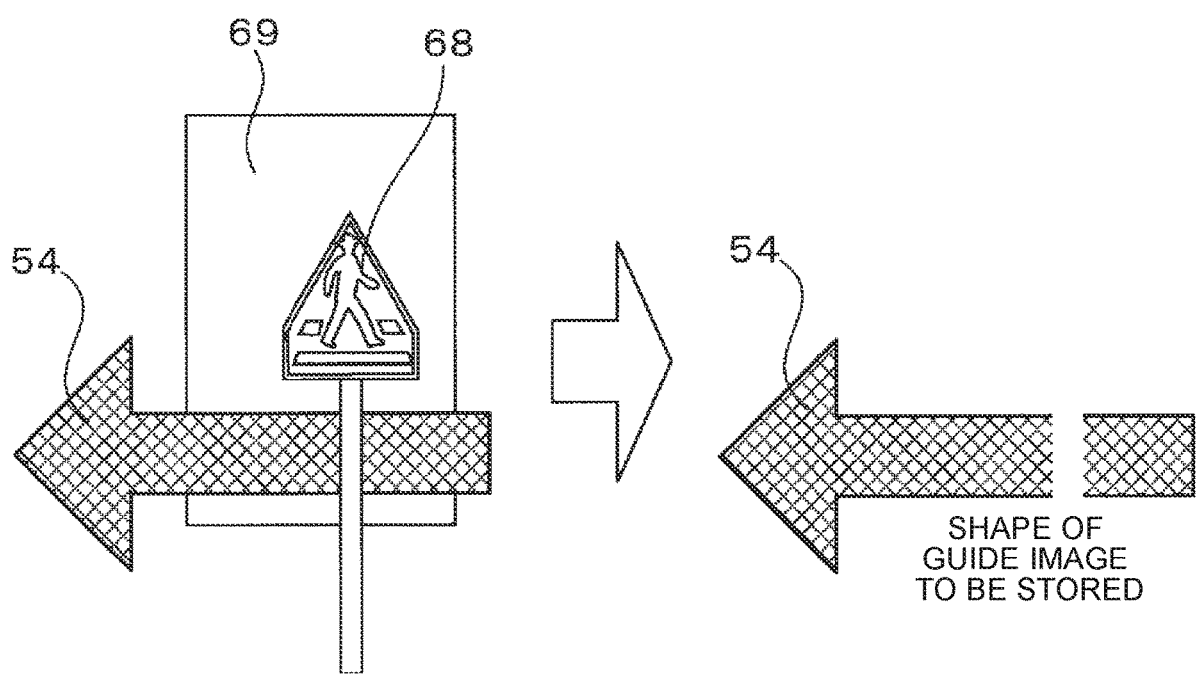
FIG. 7 is an explanatory diagram of a generation method of a guide image that is to be displayed on an HUD.

Then, in S6, the CPU 41 stores the shape of the guide image contained in the visually-recognized image, as a display mode of the guide image to be displayed by the HUD 4. The shape of the guide image contained in the visually-recognized image is the shape of the guide image that can be visually recognized when the objects (such as roads, buildings, road signs, other signs, virtual objects, and guide images) arranged on the three-dimensional map are visually recognized from the viewpoint of the vehicle (driver). If the guide branch point image 54 overlaps the objects 68 (such as road signs and buildings) located on the near side and is visually recognized, as illustrated in FIG. 7, the shape of the guide image that is stored in the above S6 does not contain the overlapping portions. In contrast, if the guide branch point image 54 overlaps the objects 69 located on the far side and is visually recognized, the shape that is stored contains the overlapping portions.

Further, in S7, the CPU 41 obtains the position of the guide image arranged on the three-dimensional map.

After that, in S8, the CPU 41 performs display range determination processing (FIG. 10) described below. In the display range determination processing, the range for displaying the guide image in the HUD 4 (the range for projecting the guide image on the windshield 8, or the range for displaying the guide image on the liquid crystal display 6 of the HUD 4) is determined.

Subsequently, in S9, the CPU 41 transmits a control signal to the HUD 4 so as to display the guide image with the shape stored in the above S6 on the liquid crystal display 6 of the HUD 4, in the display range determined in the above S8. As a result, the virtual image of the guide image is visually recognized by the driver of the vehicle as being superimposed on the view ahead of the vehicle.

Figure 8:
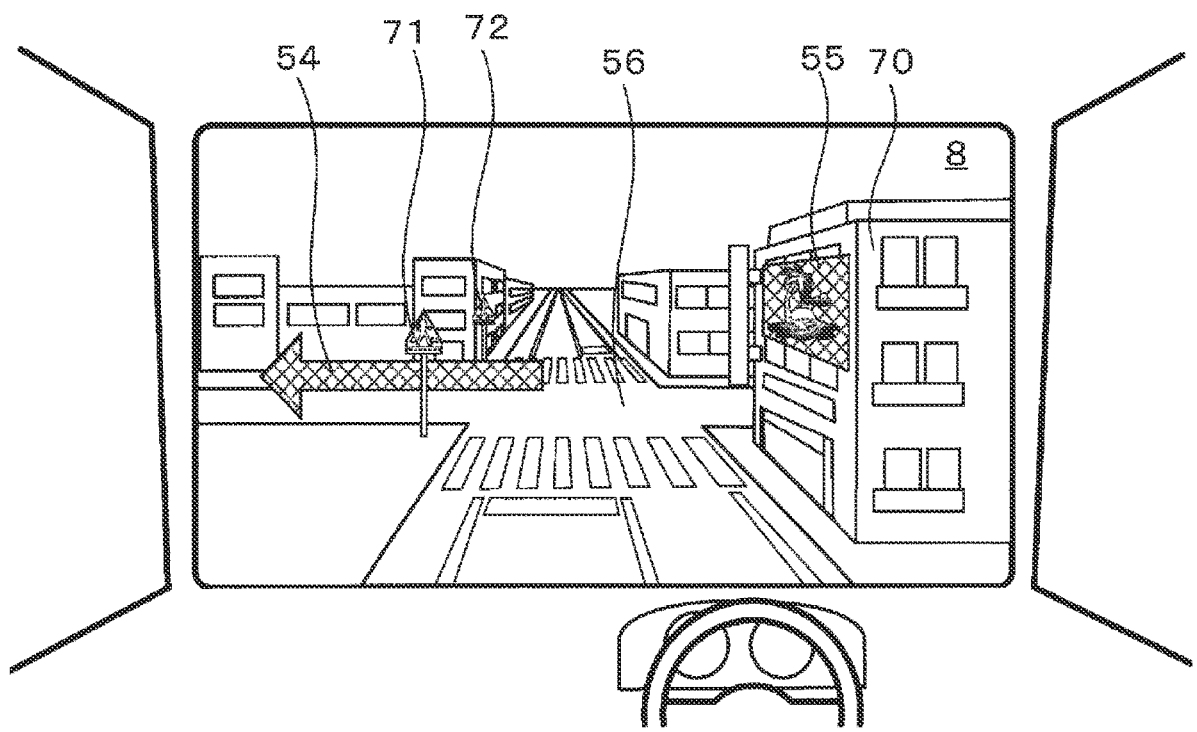
FIG. 8 illustrates an example of virtual images of the guide branch point image and the sign image visually recognized by the driver of the vehicle.

FIG. 8 illustrates a virtual image of a guide image visually recognized by a driver of a vehicle especially in the case where the travel direction of the vehicle that travels on the travel path after leaving a guide branch point is the leftward direction (that is, turning left).

As illustrated in FIG. 8, a guide branch point image 54 representing an arrow indicating moving leftward is displayed as a virtual image through the windshield 8 of the vehicle, so as to be superimposed at the position upwardly spaced from the road surface of the travel path after turning left at the guide branch point 56. In addition, the sign image 55 advertising a facility 70 is displayed as a virtual image so as to be superimposed on a wall surface of the facility 70 that is positioned on the right side ahead of the vehicle. The virtual image of the guide branch point image 54 is displayed in a manner such that a region overlapping a nearby object located on the near side of the travel path, namely, a road sign 71, is removed. Accordingly, the guide branch point image 54 extends on the far side of (behind) the road sign 71 and is visually recognized. In contrast, the guide branch point image 54 is displayed over a road sign 72 disposed on the far side of the travel path. Accordingly, the guide branch point image 54 extends on the near side of the road sign 72 and is visually recognized. This allows the driver 9 to recognize the perspective relationship between the position of the road signs 71 and 72 and the position of the virtual image of the guide branch point image 54, and hence accurately know the travel path to take. Although FIG. 8 illustrates particularly an example in which a nearby object overlapping the virtual image of the guide branch point image 54 is a road sign, the guide branch point image 54 is displayed in the same manner even when a nearby object is a building or a moving object (a pedestrian or another vehicle). The virtual image of the sign image 55 is displayed such that the perspective relationship between the virtual image of the sign image 55 and a nearby object is clear when the virtual image of the sign image 55 overlaps the nearby object in the same manner as the guide branch point image 54.

FIG. 8 illustrates an example in which the virtual image of the guide branch point image 54 and the virtual image of the sign image 55 are both displayed at the same time. However, depending on the state of the vehicle, there is a case where only the virtual image of the guide branch point image 54 is displayed and a case where only the virtual image of the sign image 55 is displayed. There is also a case where a guidance line image 60 described below is displayed at the same time.

Figure 9:
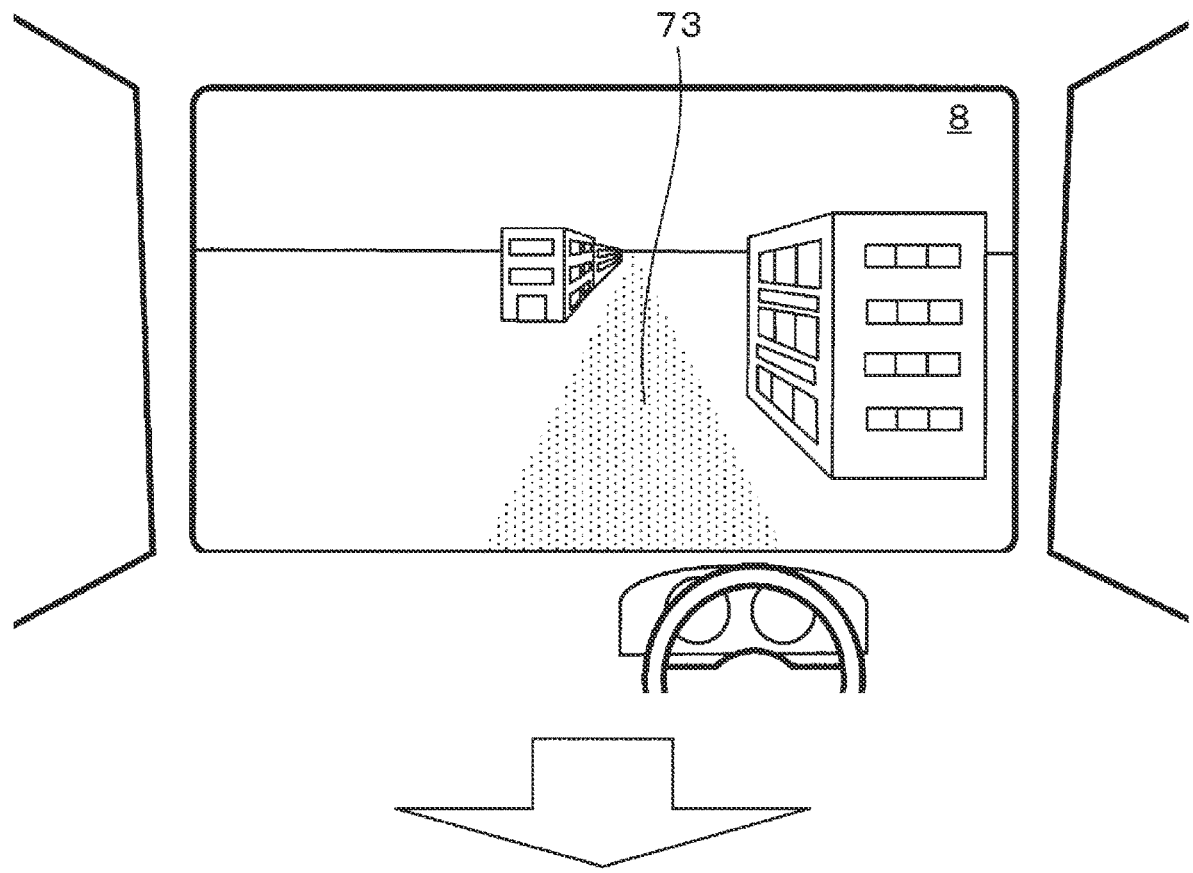
FIG. 9 illustrates an example of a virtual image of a guidance line image visually recognized by the driver of the vehicle.
Figure 9:
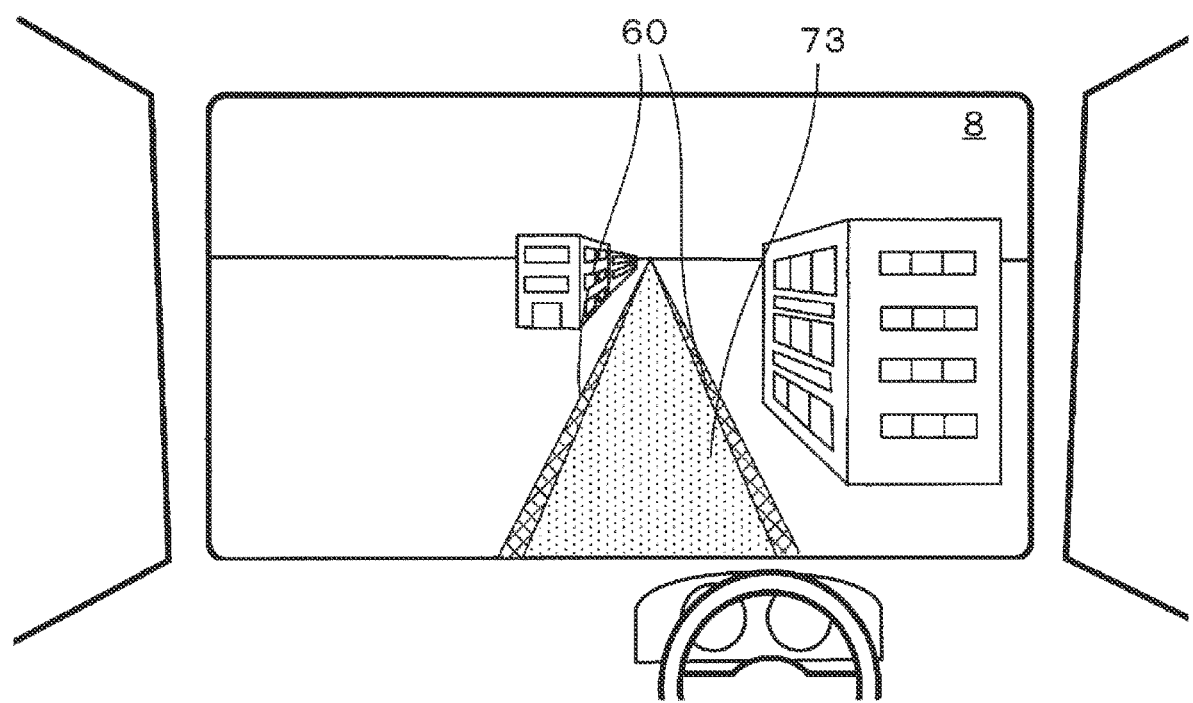

In contrast, FIG. 9 illustrates a virtual image of a guide image visually recognized by a driver of a vehicle when the vehicle travels along a road on which a roadway outer line is not drawn.

As illustrated in FIG. 9, the guidance line image 60 indicating the limit of the range in which the vehicle can travel is displayed as a virtual image through the windshield 8 of the vehicle, on a road surface of the road 73 of the road that the vehicle is traveling along. Before the virtual image of the guidance line image 60 is displayed, as illustrated in the upper figure of FIG. 9, it is difficult for the driver to recognize how far and wide the road 73 extends, that is, recognize the range in which the vehicle can travel. However, when the guidance line image 60 is displayed as illustrated in the lower figure of FIG. 9, it is thus possible for the driver to easily recognize the range in which the vehicle can travel, with the guidance line image 60 serving as a boundary. The virtual image of the guidance line image 60 is displayed in a manner such that a region overlapping a nearby object (such as a building, a pedestrian, and other vehicles) located on the near side of the road surface is removed, in the same manner as the virtual image of the guide branch point image 54 described above. Thus, the perspective relationship between the virtual image of the guidance line image 60 and the nearby object is clear.

Figure 10:
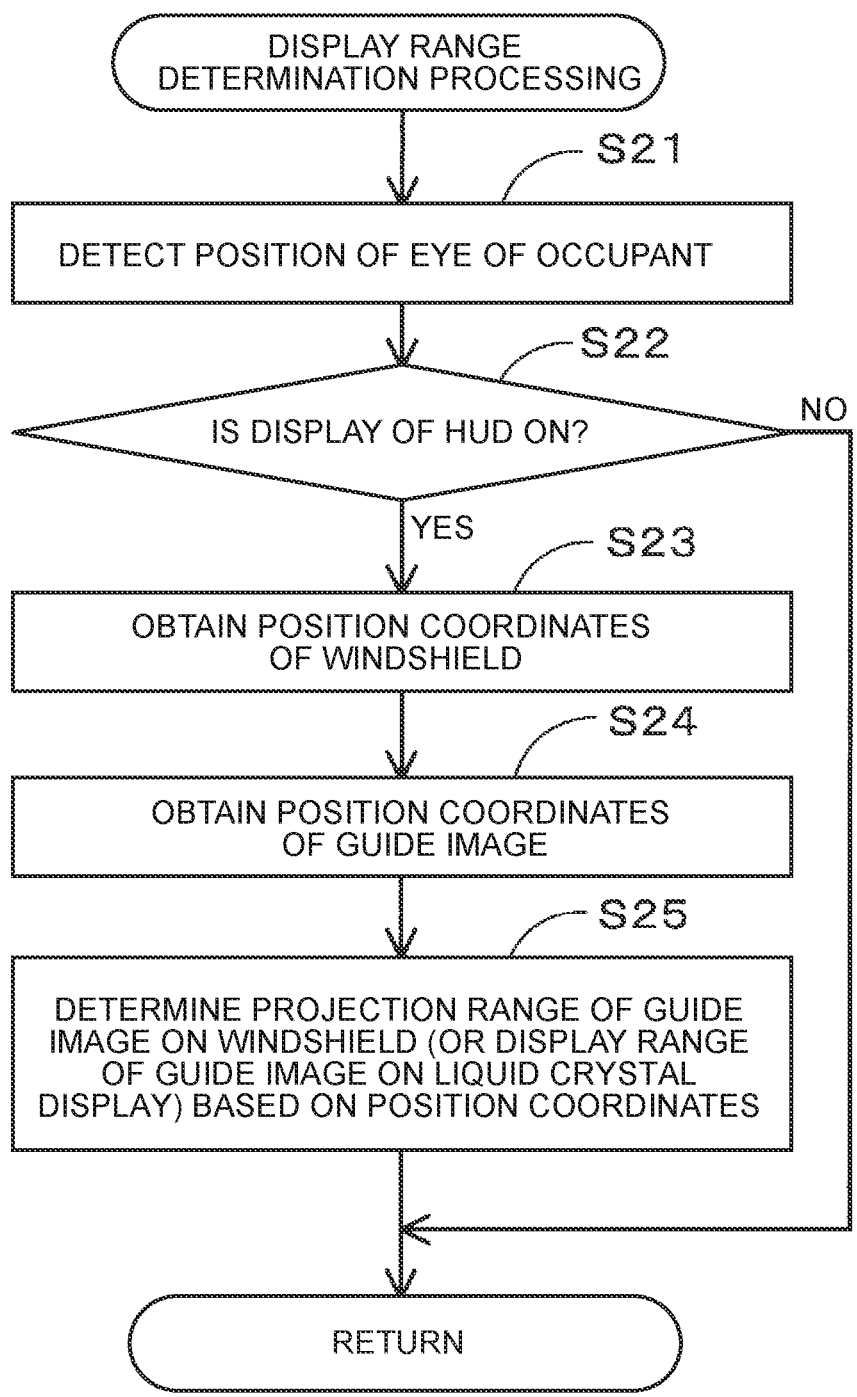
FIG. 10 is a flowchart of a sub-processing program of display range determination processing.

In the following, sub-processing of display range determination processing executed in the above S8 will be described with reference to FIG. 10. FIG. 10 is a flowchart of a sub-processing program of display range determination processing.

First, in S21, the CPU 41 detects the position of the eye of the driver of the vehicle, based on the captured image captured by the in-vehicle camera 12. The detected position of the eye is specified by the three-dimensional position coordinates.

Then, in S22, the CPU 41 determines whether the display of the HUD 4 is turned ON. The ON/OFF of the display of the HUD 4 can be switched by an operation of the driver of the vehicle. The ON/OFF may also be switched automatically based on the surrounding circumstances and the state of the vehicle.

Then, if the display of the HUD 4 is determined to be turned ON (S22: YES), the process proceeds to S23. In contrast, if the display of the HUD 4 is determined to be OFF (S22: NO), the process ends without causing the HUD 4 to display a virtual image of the guide image.

In S23, the CPU 41 obtains the position coordinates of the windshield 8 on which an image is reflected by the HUD 4. The position coordinates of the windshield 8 are specified by the three-dimensional position coordinates.

Then, in S24, the CPU 41 obtains, as the coordinates of the guide image, the coordinates that specify the position of the guide image arranged on the three-dimensional map obtained in the above S7. The position coordinates of the guide image are also specified by the three-dimensional position coordinates.

Subsequently, in S25, the CPU 41 determines a projection range of the guide image on the windshield 8, based on the respective sets of position coordinates obtained in the above S21, S23, and S24. The CPU 41 also determines a display range of the guide image on the liquid crystal display 6 in the HUD 4, based on the determined projection range. Then, the process goes to S9, in which a virtual image is displayed using the HUD 4, based on the determined projection range and the display range. The operations of S6 to S9 are repeated until the display of the HUD is turned OFF.

As described in detail above, according to the superimposed image display device and the computer program executed in the superimposed image display device of the present embodiment, when a guide image providing guidance of information to a driver of a vehicle is displayed such that the guide image is superimposed on a view ahead of the vehicle and is visually recognized, a three-dimensional map information 34 that specifies a three-dimensional shape of a road and a structure nearby the road is obtained (51), the guide image is arranged in the three-dimensional map information based on the three-dimensional shape of the road and the structure nearby the road (S5), a shape of the guide image that is visually recognized from a position of the driver in the three-dimensional map information is obtained (S6), and the guide image of the obtained shape is displayed (S9). This allows the driver of the vehicle to accurately recognize the positional relationship between the guide image and the nearby structure.

It should be understood that the above embodiments are not limiting, and various improvements and modifications may be made.

For example, in the present embodiment described above, the HUD 4 generates a virtual image ahead of the windshield 8 of the vehicle 2. However, a virtual image may be generated ahead of a window other than the windshield 8. Further, an image may be reflected on a visor (combiner) installed around the windshield 8, instead of being reflected on the windshield 8 by the HUD 4.

In the present embodiment, although the HUD 4 is used as the means for displaying an image to be superimposed on the surrounding environment, a windshield display (WSD) that displays an image on the windshield 8 may be used. Alternatively, a display device that superimposes a guide image on the real view displayed on the liquid crystal display 17 of the navigation device 3 may be used.

In the present embodiment, guide images of the three types (A) to (C) described above are displayed as the guide image. However, other guide images may be displayed as the guide image to indicate information to the driver of the vehicle. For example, a three-dimensional object surrounding an object to be warned of may be displayed as the guide image. A guide image corresponding to various road surface markings such as a partition line besides the roadway outer line, a zebra crossing, and a stopping line may be displayed. The timing at which the guide image of the road surface marking is displayed is set to be when visibility of the road surface marking from the driver of the vehicle is equal to or less than a threshold, for example. A position at which the guide image is displayed is a position at which the road surface marking is drawn and on the road surface that the vehicle travels on.

It is possible to detect a road and a structure nearby the road and generate a three-dimensional map information 51 as a simulation, by performing point cloud matching on the captured image that is captured with the front camera 11, even for areas for which there is no three-dimensional map information 34. It is also possible to perform processing in and after S2 by using the generated three-dimensional map 51.

In the present embodiment, the processing of the travel support processing program (FIG. 3) is executed by the navigation ECU 15 of the navigation device 3. However, the component that executes the processing may be appropriately changed. For example, a control unit of the HUD 4, a vehicle control ECU, or other in-vehicle devices may execute the processing. In the case where the control unit of the HUD 4 executes the processing, the superimposed image display device may include only the HUD 4.

Although the embodiments of the superimposed image display device have been described above, the superimposed image display device may have the following configurations. In that case, the following effects are achieved.

For example, a first configuration is as follows.

A superimposed image display device (1) that is mounted on a vehicle (2) and that displays a guide image (54, 55, 60) such that the guide image (54, 55, 60) is superimposed on a view ahead of the vehicle and is visually recognized, the guide image providing guidance of information to a driver of the vehicle, the superimposed image display device (1) including: map information obtaining means (41) for obtaining three-dimensional map information (34) that specifies a three-dimensional shape of a road and a structure nearby the road; image arranging means (41) for arranging the guide image in the three-dimensional map information, based on the three-dimensional shape of the road and the structure (52) nearby the road; shape obtaining means (41) for obtaining a shape of the guide image that is visually recognized from a position of the driver (9) in the three-dimensional map information; and guide image displaying means (41) for displaying the guide image having the shape obtained by the shape obtaining means.

With the superimposed image display device having the above configuration, the shape of the guide image to be displayed is specified by arranging the guide image in the three-dimensional map information that specifies the three-dimensional shape of the road and the structures nearby the road. This allows the driver of the vehicle to accurately recognize the positional relationship between the guide image and the nearby structure.

A second configuration is as follows.

The guide image has a two-dimensional shape or a three-dimensional shape.

According to the superimposed image display device having the above configuration, even when the shape of the guide image is a two-dimensional shape or a three-dimensional shape, it is possible to specify the shape of the guide image visually recognized by the driver of the vehicle.

A third configuration is as follows.

The position of the driver (9) is a position of an eye of the driver, the superimposed image display device has driver information obtaining means (41) for obtaining the position of the eye of the driver, and the shape obtaining means (41) obtains the shape of the guide image that is visually recognized from the position of the eye of the driver in the three-dimensional map information.

According to the superimposed image display device having the above configuration, even when there is a structure nearby the vehicle, it is possible to easily specify the shape of the guide image visually recognized by the driver of the vehicle in consideration of the structure.

A fourth configuration is as follows.

The superimposed image display device has: captured image obtaining means (41) for obtaining a captured image that captures a view ahead of the vehicle; comparing means for comparing the captured image and the three-dimensional map information (34); and driver position specification means (41) for specifying the position of the driver (9) in the three-dimensional map information, based on a comparison result of the comparing means.

According to the superimposed image display device having the above configuration, it is possible to accurately specify the position of the driver relative to the three-dimensional map information by comparing the captured image and the three-dimensional map information.

A fifth configuration is as follows.

The comparing means (41) compares the captured image and the three-dimensional map information (34) at prescribed intervals, the superimposed image display device has position estimating means (41) for estimating the position of the driver in the three-dimensional map information, during a time between timings at which the comparison is performed, and the driver position specification means (41) specifies as the position of the driver in the three-dimensional map information, the estimated position of the driver during the time between the timings at which the comparison is performed.

According to the superimposed image display device having the above configuration, it is possible to reduce processing load by reducing the number of times comparison is performed, and it is also possible to ensure accuracy in specifying the position of the driver relative to the three-dimensional map information by estimating the position of the driver relative to the three-dimensional map information.

A sixth configuration is as follows.

The guide image (54, 55, 60) includes at least one of an image indicating a route along which the vehicle travels, a sign image, and a guidance line image on a road surface.

According to the superimposed image display device having the above configuration, it is possible to cause the driver of the vehicle to accurately recognize the positional relationship between the nearby structure and various guide images related to an arrow that provides guidance about the traveling direction of the vehicle at the guidance branch point, a sign indicating a facility or a point, and the guidance line on the road surface, for example.

A seventh configuration is as follows.

The guidance line image on the road surface is a road surface marking image.

According to the superimposed image display device having the above configuration, it is possible to assist driving operation of the driver by causing the driver to visually recognize the road surface marking image on a road in which there is no road surface marking but there should be a road surface marking or when there is a road surface marking but it is difficult for the driver to visually recognize the road surface marking.

An eighth configuration is as follows.

The guidance line image on the road surface is superimposed with a boundary between a roadway and a sidewalk or an edge of a roadway.

According to the superimposed image display device having the above configuration, it is possible to assist driving operation of the driver by especially causing the driver to visually recognize the guidance line that indicates a range in which the vehicle can travel.

A ninth configuration is as follows.

The structure (52) is at least one building or road sign.

According to the superimposed image display device having the above configuration, it is possible to cause the driver of the vehicle to accurately recognize the positional relationship between the guide image and the nearby building or road sign.

A tenth configuration is as follows.

A virtual object that specifies a three-dimensional shape of a moving object nearby the vehicle is arranged in the three-dimensional map information (34).

According to the superimposed image display device having the above configuration, it is possible to cause the driver of the vehicle to accurately recognize the positional relationship between the guide image and the moving object when there is the moving object such as a pedestrian and a bicycle nearby the vehicle.

The invention claimed is:

1. A superimposed image display device that is mounted on a vehicle and that displays a guide image such that the guide image is superimposed on a view ahead of the vehicle and is visually recognized, the guide image providing guidance of information to a driver of the vehicle, the superimposed image display device comprising:
a processor programmed to:
obtain three-dimensional map information that specifies a three-dimensional shape of a road and a structure nearby the road;
obtain a captured image that captures a view ahead of the vehicle;
compare the captured image and the three-dimensional map information at prescribed intervals, the prescribed interval is an interval where a comparison is done each time a structure having a distinctive shape, which can be easily compared, is included in the captured image;
specify a position of the driver in the three-dimensional map information, based on a result of the comparison;
estimate the position of the driver in the three-dimensional map information, during a time between timings at which the comparison is performed;
specify as the position of the driver in the three-dimensional map information, the estimated position of the driver during the time between timings at which the comparison is performed;
arrange the guide image in the three-dimensional map information, based on the three-dimensional shape of the road and the structure nearby the road;
obtain a shape of the guide image that is visually recognized from the position of the driver in the three-dimensional map information; and
display the guide image having the obtained shape.

2. The superimposed image display device according to claim 1, wherein the guide image has a two-dimensional shape or a three-dimensional shape.

3. The superimposed image display device according to claim 1, wherein:
the position of the driver is a position of an eye of the driver; and
the processor is programmed to:
obtain the position of the eye of the driver, and
obtain the shape of the guide image that is visually recognized from the position of the eye of the driver in the three-dimensional map information.

4. The superimposed image display device according to claim 1, wherein the guide image includes at least one of an image indicating a route along which the vehicle travels, a sign image, and a guidance line image on a road surface.

5. The superimposed image display device according to claim 4, wherein the guidance line image on the road surface is a road surface marking image.

6. The superimposed image display device according to claim 4, wherein the guidance line image on the road surface is superimposed with a boundary between a roadway and a sidewalk or an edge of a roadway.

7. The superimposed image display device according to claim 1, wherein the structure is at least one building or road sign.

8. The superimposed image display device according to claim 1, wherein a virtual object that specifies a three-dimensional shape of a moving object nearby the vehicle is arranged in the three-dimensional map information.

9. A computer-readable storage medium storing a computer-executable computer program causing a computer to perform functions, comprising:
- displaying a guide image providing a guidance of information to a driver of a vehicle such that the guide image is superimposed on a view ahead of the vehicle and is visually recognized;
- obtaining three-dimensional map information that specifies a three-dimensional shape of a road and a structure nearby the road;
- obtaining a captured image that captures a view ahead of the vehicle;
- comparing the captured image and the three-dimensional map information at prescribed intervals, the prescribed interval is an interval where a comparison is done each time a structure having a distinctive shape, which can be easily compared, is included in the captured image;
- specifying a position of the driver in the three-dimensional map information, based on a result of the comparison;
- estimating the position of the driver in the three-dimensional map information, during a time between timings at which the comparison is performed;
- specifying as the position of the driver in the three-dimensional map information, the estimated position of the driver during the time between timings at which the comparison is performed;
- arranging the guide image in the three-dimensional map information, based on the three-dimensional shape of the road and the structure nearby the road;
- obtaining a shape of the guide image that is visually recognized from the position of the driver in the three-dimensional map information; and
- displaying the guide image having the obtained shape.

\* \* \* \* \*